(12) United States Patent
Fisher (10) Patent No.: US 8,122,703 B2
(45) Date of Patent: Feb. 28, 2012

(54) COAXIAL IGNITION ASSEMBLY (75) Inventor: Steven C. Fisher, Simi Valley, CA (US)

(73) Assignee: United Technologies Corporation, Hartford, CT (US)

( * ) Notice: Subject to any disclaimer, the term of this patent is extended or adjusted under 35 U.S.C. 154(b) by 1236 days.

(21) Appl. No.: 11/414,605

(22) Filed: Apr. 28, 2006

(65) Prior Publication Data

US 2009/0320447 A1 Dec. 31, 2009

(51) Int. Cl.
*F02K 9/00* (2006.01)
(52) U.S. Cl. .................................... 60/258; 60/39.827
(58) Field of Classification Search .............. 60/39.821, 60/39.827, 39.828, 257, 258
See application file for complete search history.

(56) References Cited

U.S. PATENT DOCUMENTS 2,523,656 A 9/1950 Goddard
(Continued)

FOREIGN PATENT DOCUMENTS

DE 3037773 A1 7/1981
(Continued)

OTHER PUBLICATIONS

Official Action for Russian Patent Application No. 2007116055/06(017441), filed Apr. 27, 2007.
(Continued)

*Primary Examiner* — Louis Casaregola
*Assistant Examiner* — Phutthiwat Wongwian
(74) *Attorney, Agent, or Firm* — Kinney & Lange, P.A.

(57) ABSTRACT

A bi-propellant injector includes first and second injector elements and a spark exciter assembly. The first injector element has a conductive layer electrically connected to the spark exciter assembly and a nonconductive layer disposed on an exterior portion of the conductive layer. The second injector element comprises a conductive material and has an opening therethrough in fluid communication with a combustion chamber. An end of the first injector element is positioned at or near the opening in the second injector element. The spark exciter assembly can generate an electrical arc between the conductive layer of the first injector element and the second injector element.

9 Claims, 5 Drawing Sheets

U.S. PATENT DOCUMENTS

| | | | |
|---|---|---|---|
| 2,928,240 A * | 3/1960 | Burton et al. ................... 60/786 |
| 3,048,966 A | 8/1962 | Feraud et al. |
| 3,085,393 A | 4/1963 | Hamlin, Jr. |
| 3,137,130 A | 6/1964 | Tinkelenberg |
| 3,178,884 A | 4/1965 | Boardman, Jr. |
| 3,266,241 A | 8/1966 | Jennings |
| 3,272,770 A | 9/1966 | Lundahl |
| 3,334,490 A | 8/1967 | Hoeptner et al. |
| 3,350,886 A | 11/1967 | Ferand et al. |
| 3,446,924 A | 5/1969 | Giambertoni |
| 3,490,238 A | 1/1970 | Capps et al. |
| 3,570,249 A | 3/1971 | Baum et al. |
| 3,577,735 A | 5/1971 | Schmidt |
| 3,662,547 A | 5/1972 | Paine et al. |
| 3,662,960 A | 5/1972 | Mitchell et al. |
| 3,691,769 A | 9/1972 | Keilbach et al. |
| 3,695,041 A | 10/1972 | Eggers et al. |
| 3,699,772 A | 10/1972 | Elverum, Jr. |
| 3,780,952 A | 12/1973 | Huang |
| 3,882,676 A | 5/1975 | Schmidt |
| 3,903,693 A | 9/1975 | Fox |
| 3,910,037 A | 10/1975 | Salkeld |
| 3,926,169 A | 12/1975 | Leshner et al. |
| 3,943,706 A | 3/1976 | Grafwallner et al. |
| 4,073,138 A | 2/1978 | Beichel |
| 4,171,615 A | 10/1979 | Stewart et al. |
| 4,214,439 A | 7/1980 | Browning et al. |
| 4,220,001 A | 9/1980 | Beichel |
| 4,326,377 A | 4/1982 | Jaqua |
| 4,583,362 A | 4/1986 | Wagner |
| 4,589,253 A | 5/1986 | Wagner |
| 4,621,492 A | 11/1986 | von Pragenau |
| 4,707,982 A | 11/1987 | Wagner |
| 4,721,081 A | 1/1988 | Krauja et al. |
| 4,771,599 A | 9/1988 | Brown et al. |
| 4,771,600 A | 9/1988 | Limerick et al. |
| 4,771,601 A | 9/1988 | Spies |
| 4,777,794 A | 10/1988 | Nielsen |
| 4,801,092 A | 1/1989 | Webber et al. |
| 4,879,874 A | 11/1989 | Koyari et al. |
| 4,894,986 A | 1/1990 | Etheridge |
| 4,912,925 A | 4/1990 | Foust |
| 4,998,410 A | 3/1991 | Martinez-Leon et al. |
| 5,025,623 A | 6/1991 | Hirakoso et al. |
| 5,054,287 A | 10/1991 | Schneider |
| 5,109,669 A | 5/1992 | Morris et al. |
| 5,267,437 A | 12/1993 | Foust |
| 5,404,715 A | 4/1995 | Vuillamy et al. |
| 5,444,973 A | 8/1995 | Limerick et al. |
| 5,551,230 A | 9/1996 | Meng |
| 5,603,213 A | 2/1997 | Sion et al. |
| 5,647,201 A | 7/1997 | Hook et al. |
| 5,660,039 A | 8/1997 | Sion et al. |
| 5,715,788 A | 2/1998 | Tarr et al. |
| 5,873,240 A | 2/1999 | Bussing et al. |
| 5,873,241 A | 2/1999 | Foust |
| 5,918,460 A | 7/1999 | Connell et al. |
| 5,941,062 A | 8/1999 | Koppel et al. |
| 5,980,782 A | 11/1999 | Hershkowitz et al. |
| 6,050,085 A | 4/2000 | Mayer |
| 6,082,098 A | 7/2000 | Park et al. |
| 6,226,980 B1 | 5/2001 | Katorgin et al. |
| 6,244,040 B1 | 6/2001 | Adzhian et al. |
| 6,244,041 B1 | 6/2001 | Vasin et al. |
| 6,253,539 B1 | 7/2001 | Farhangi et al. |
| 6,269,630 B1 | 8/2001 | Kreiner et al. |
| 6,272,847 B1 | 8/2001 | Dietrich |
| 6,381,949 B1 | 5/2002 | Kreiner et al. |
| 6,469,424 B1 | 10/2002 | Marable |
| 6,470,670 B2 | 10/2002 | Maeding |
| 6,505,463 B2 | 1/2003 | Kruse et al. |
| 6,536,208 B1 | 3/2003 | Kretschmer |
| 6,568,171 B2 | 5/2003 | Bulman |
| 6,655,127 B2 | 12/2003 | Kruse et al. |
| 6,769,242 B1 | 8/2004 | Balepin |
| 6,918,243 B2 | 7/2005 | Fisher |
| 7,565,795 B1 * | 7/2009 | Horn et al. .................... 60/200.1 |
| 2001/0015063 A1 | 8/2001 | Maeding |
| 2003/0046923 A1 | 3/2003 | Dressler et al. |
| 2004/0148923 A1 | 8/2004 | Hewitt |
| 2004/0177603 A1 | 9/2004 | Hewitt |
| 2008/0302335 A1 * | 12/2008 | Fang et al. .................... 123/468 |

FOREIGN PATENT DOCUMENTS

| RU | 2183761 C2 | 6/2002 |
| RU | 2191278 C2 | 10/2002 |

OTHER PUBLICATIONS

Decision on Grant from Russian Patent Application No. 2007116055, filed on Apr. 27, 2007.

\* cited by examiner

COAXIAL IGNITION ASSEMBLY

BACKGROUND OF THE INVENTION

The present invention relates to rocket engine injectors and ignition systems, and more particularly the present invention relates to non-hypergolic propellant injectors and ignition systems.

In a typical liquid propellant rocket engine, bi-propellant injection elements are used to facilitate the injection, distribution, mixing and combustion of an oxidizer and a fuel in a combustion chamber. In a large rocket engine, hundreds of injector elements may be present with a large ignition system assembly (or spark torch assembly) located in the center of the injector element array. The large ignition assembly can ignite the propellants by creating a standing flame or torch, like a "pilot light", that is used to initiate combustion within the combustion chamber. This large ignition assembly utilizes its own dedicated propellant mixture to create and maintain the "pilot light", and those dedicated propellant mixtures have significant differences from the propellant mixtures used to provide engine thrust. The need for dedicated "pilot light" propellant supplies complicates engine design. The use of large igniter assemblies also leads to performance losses due to the off-condition mixing of the dedicated propellants used to create the "pilot light" (i.e., due to use of a different mixture ratio than an optimum thrust performance mixture ratio). Moreover, large "pilot light" ignition assemblies are bulky in terms of both size and mass, which makes them less desirable for use with smaller rocket engines.

There are also known spark ignition systems for providing ignition sparks within a reaction zone in the combustion chamber. However, such systems present difficulties in fabricating system components and pose problems with component degradation during use. For instance, special injection orifices and manifolds are required to direct fuel and oxidizer to create an easily ignited mixture of propellants at the exposed electrodes. Direct spark ignition systems through an injector faceplate can also add weight, increase design complexity, and typically operate at off-optimum mixture ratios (usually at fuel-rich ratios) to preclude thermal damage to the electrodes, but which lower overall combustion performance.

Smaller rocket engines, such as positioning thruster engines, have historically used hypergolic propellants (i.e., propellants that spontaneously ignite when combined). However, it is desired to develop rocket engines that utilize non-hypergolic propellants.

The present invention provides a non-hypergolic propellant injection and ignition system that is suitable for use with relatively small rocket engines.

BRIEF SUMMARY OF THE INVENTION

A bi-propellant injector includes first and second injector elements and a spark exciter assembly. The first injector element has a conductive layer electrically connected to the spark exciter assembly and a nonconductive layer disposed on an exterior portion of the conductive layer. The second injector element comprises a conductive material and has an opening therethrough in fluid communication with a combustion chamber. An end of the first injector element is positioned at or near the opening in the second injector element. The exciter can generate an electrical arc between the conductive layer of the first injector element and the second injector element.

DETAILED DESCRIPTION

The present invention provides an ignition element assembly for rocket engines that use non-hypergolic propellants. In general, the ignition element assembly enables a spark to be created between an injector tube and an injector faceplate to initiate combustion of mixed propellants in an adjacent combustion chamber. A spark exciter assembly connected to the injector tube supplies electrical energy to generate the spark. A rocket engine can utilize one or more of the ignition element assemblies to ignite propellant mixtures that enter the combustion chamber. As described in greater detail below, the ignition element assembly of the present invention provides numerous advantages over known systems for initiating combustion in a rocket engine.

Figure 1:
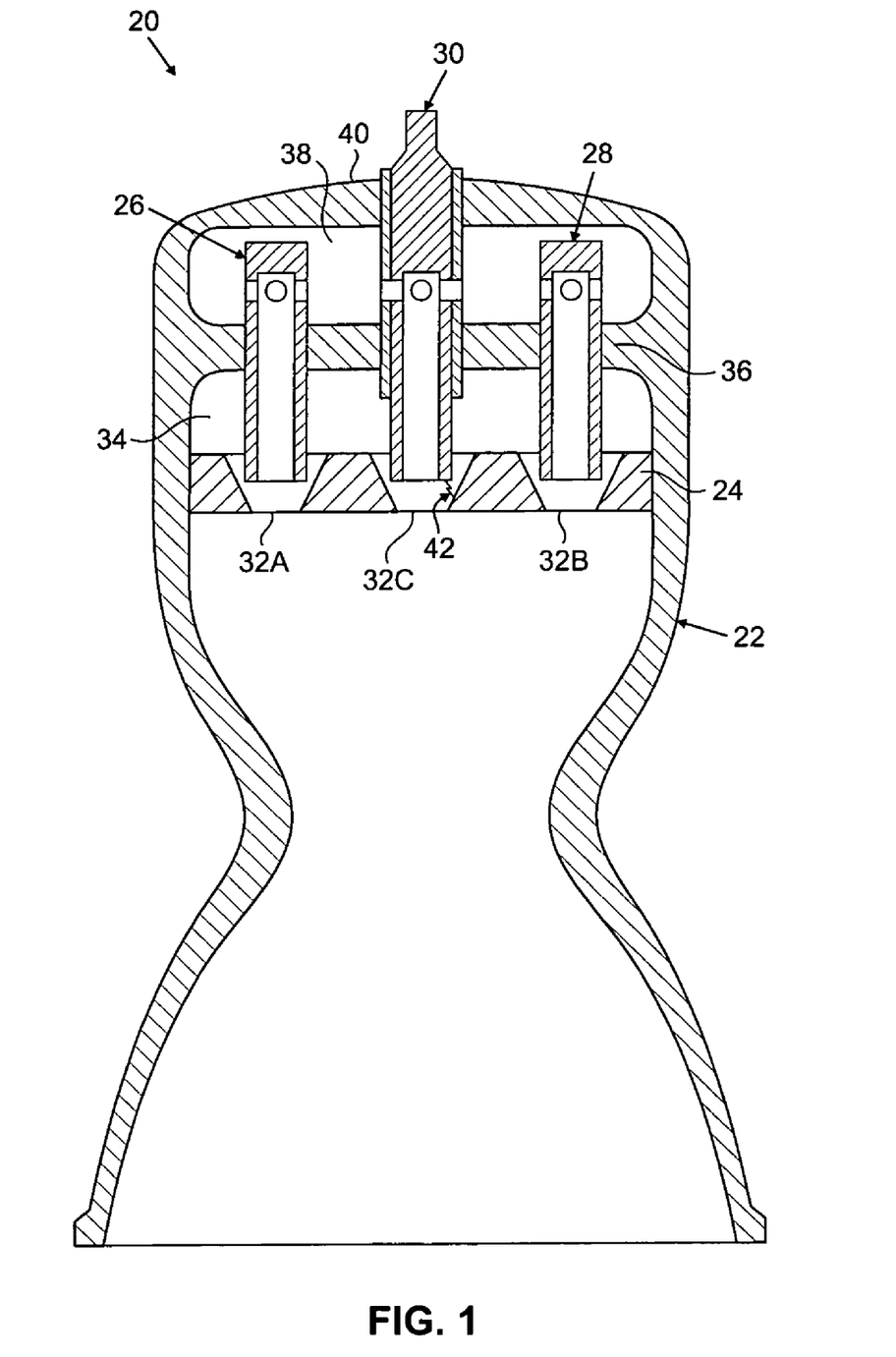
FIG. 1 is a cross-sectional schematic view of a rocket engine having an ignition system according to the present invention.

FIG. 1 is a cross-sectional schematic view of a rocket engine 20 having an ignition system according to the present invention. The engine 20 includes a combustion chamber 22 (or main thrust chamber) having converging-diverging walls, an injector faceplate 24, and an array of injector posts 26, 28 and 30. The illustrated engine 20 represents a small engine, such as a positioning thruster for a crew exploration vehicle or satellite. However, it should be recognized that the present invention can be utilized with other types of rocket engines in further alternative embodiments.

The injector faceplate 24 has a number of openings 32A-32C therethrough, with each opening 32A-32C positioned relative to one of the injector posts 26, 28 and 30, respectively. A first propellant supply manifold 34 is defined between the faceplate 24 and an interpropellant plate 36. A second propellant supply manifold 38 is defined between the interpropellant plate 36 and a dome 40.

One of the propellants is delivered from the first propellant supply manifold 34 through the injector posts 26, 28 and 30. The second propellant is delivered to the combustion chamber 22 from the second propellant supply manifold 38 through the annulus formed by the injector posts 26, 28 and 30 and the openings 32A-32C in the injector faceplate 24. One or more of the injector elements in the array are configured to also function as an ignition assembly. In the embodiment shown in FIG. 1, the central injector post 30 also functions as an igniter. A spark, such as an exemplary spark 42, is used to initiate the combustion of propellants flowing at the injector post 30, and that combustion flow in turn ignites the propellants in the combustion chamber 22. After ignition, the spark 42 is discontinued, and the central injector post 30 functions exactly as the other injector posts 26 and 28 of the array at the same high performance mixture ratio.

Combustion of a non-hypergolic bi-propellant mixture is used to provide engine thrust. The bi-propellant mixture includes an oxidizer, such as $O_2$, and a fuel, such as $H_2$. It should be noted that a variety of propellant materials can be used according to the present invention. The propellants are delivered to the combustion chamber 22 via a coaxial shear flow, in a manner generally known to those of ordinary skill in the art, and the shear velocity flow is used to atomize and mix the propellants prior to combustion in a reaction zone of the combustion chamber 22. The engine 20 normally combusts propellant mixtures having mixture ratios that are above the well-mixed flammability limits for the propellant combination.

Figure 2:
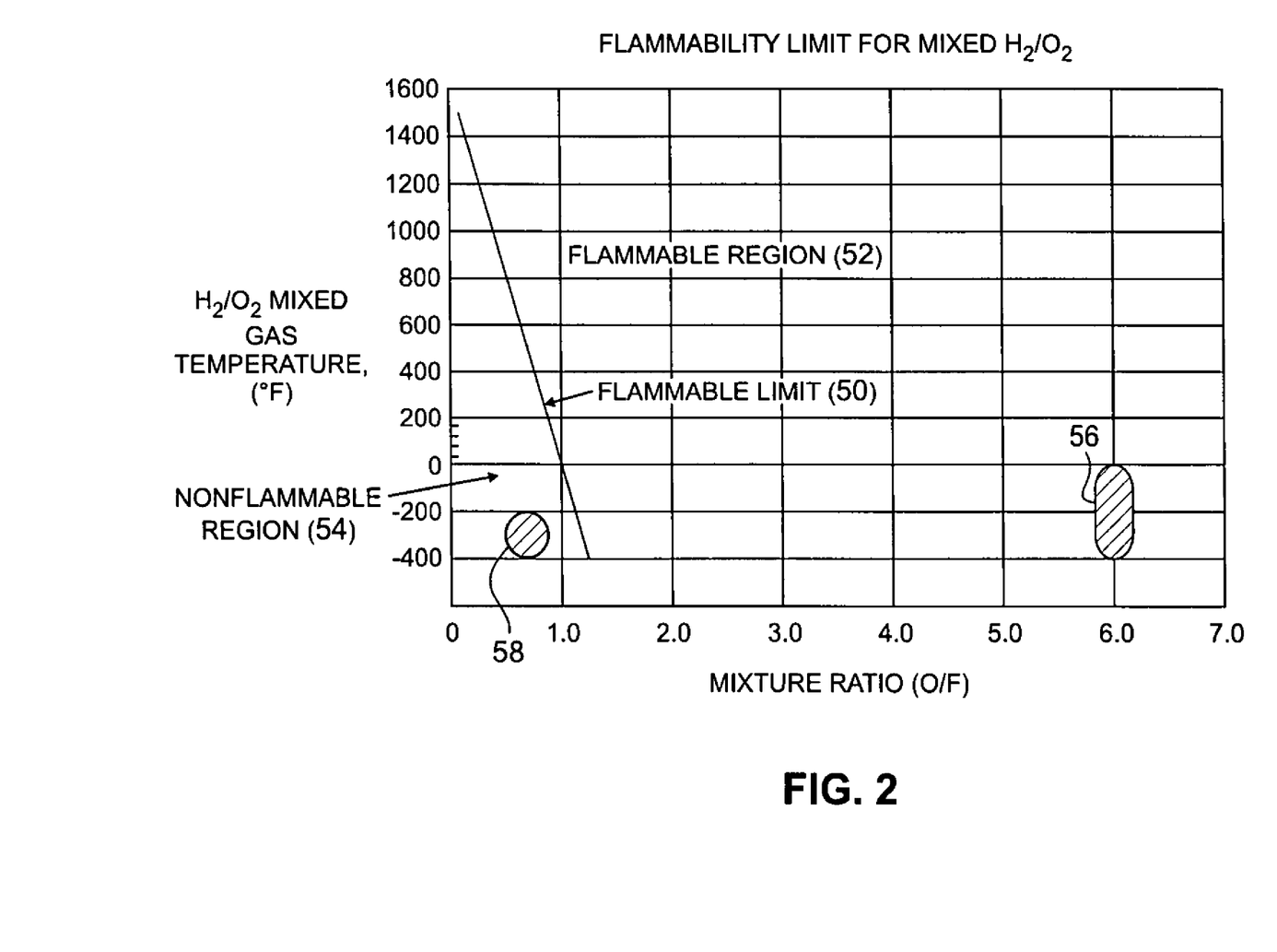
FIG. 2 is a graph of $H_2/O_2$ mixed gas temperature versus oxidizer/fuel (O/F) mixture ratio showing a flammability limit and regions indicative of combustion conditions.

FIG. 2 is a graph of $H_2/O_2$ mixed gas temperature versus oxidizer/fuel (O/F) mixture ratio for a $H_2/O_2$ bi-propellant mixture, with $O_2$ as the oxidizer and $H_2$ as the fuel. The graph illustrates a flammability limit 50, which separates the graph into a flammable region 52 and a nonflammable region 54. A suitable mixture ratio O/F of around 6.0 (for $H_2/O_2$) will provide naturally high engine performance, in terms of thrust/propellant flow rate. A region 56 is indicative of normal thruster and main combustion chamber conditions, where combustion temperatures are about 60000 Rankine (R) and performance is high. By comparison, a region 58 is indicative of turbine drive and gas generator conditions, where combustion temperatures are about 1500° R. Propellant mixtures in the region 58 are not readily conducive to ignition and to flame propagation. Therefore, past ignition systems required higher mixture ratios for ignition that, in turn, reduced turbine life. Past ignition systems have also utilized ignition sources at each injector tube in order to ignite all of the propellants. Because propellant mixtures in the region 56 are more conducive to combustion than those in the region 58, it is possible to utilize a different ignition scheme. Propellant mixtures falling generally within the region 56 readily permit propagation of a flame in the combustion chamber 22 because they fall well within the flammable region 52. As shown in FIG. 1, the single injection/ignition element 30 can be used to ignite a propellant mixture falling within region 52. Once combustion has been initiated at the injection/ignition element 30, combustion will propagate through the combustion chamber 22 to ignite substantially all of the propellants introduced into the combustion chamber 22. However, it should be understood that in further embodiments, more than one injector element of the array can include ignition capabilities. Moreover, the propellant compositions, propellant mixture ratios, and propellant mixture temperatures can vary, and the characteristics of a particular application will affect the characteristics of the region 56 on a graph like that of FIG. 2.

Figure 3:
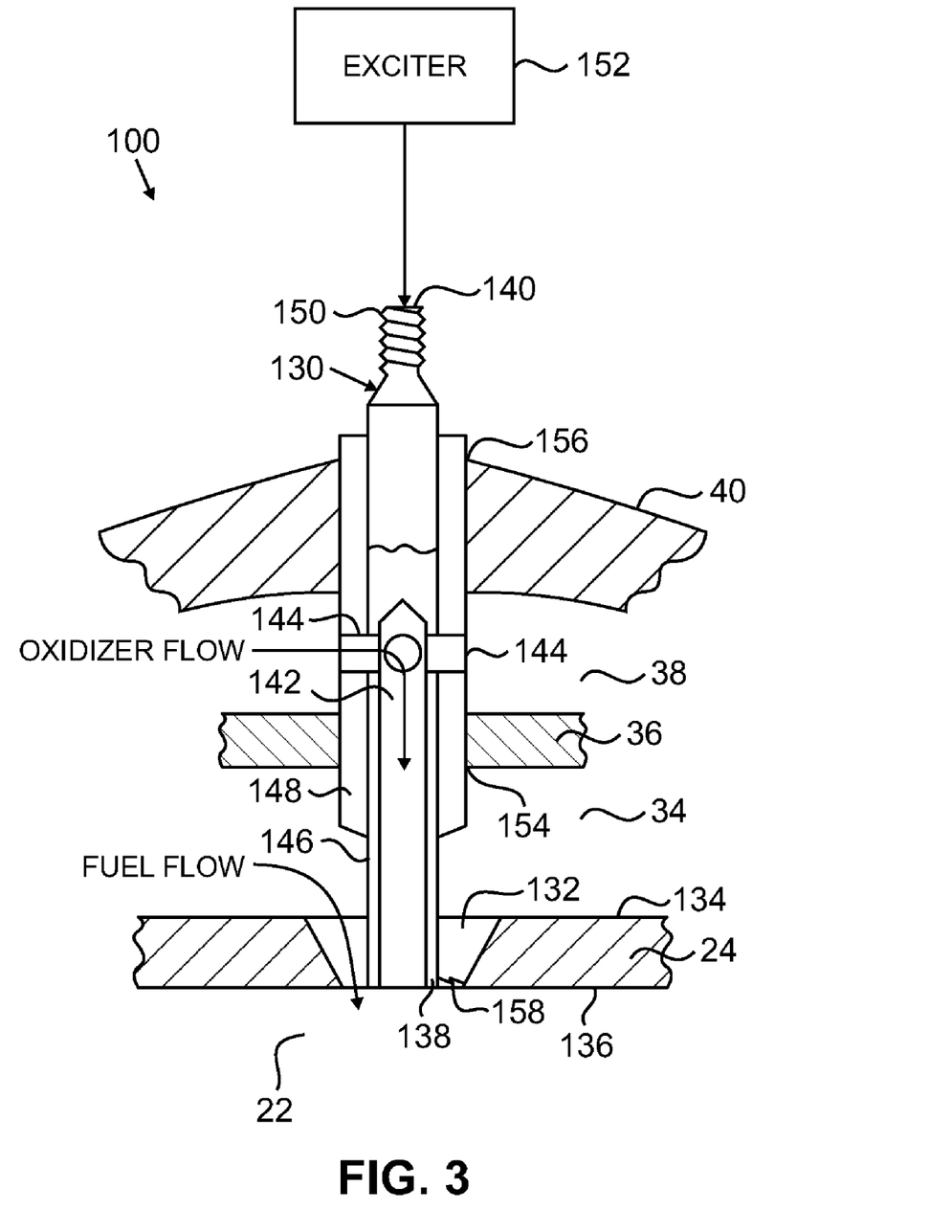
FIG. 3 is a cross-sectional view of an ignition element assembly.

FIG. 3 is a cross-sectional view of an ignition element assembly 100. The ignition element assembly 100 is suitable for use with the engine 20 shown in and described with respect to FIG. 1. The ignition element assembly 100 includes an injector faceplate 24, an interpropellant plate 36, an oxidizer dome 40, and an oxidizer post 130.

The injector faceplate 24 is a conductive metallic plate having a frusto-conical opening 132 defined between an interior face 134 and an exterior face 136, where the exterior face 136 is positioned adjacent to a combustion chamber 22. Fluids can pass through the opening 132 to the combustion chamber 22. A fuel delivery path through a fuel supply manifold 34 is defined between the interior face 134 of the faceplate 24 and the interpropellant plate 36. Fuel is provided to the fuel supply manifold 34 from storage areas (not shown) in a conventional manner, and can be pumped through the fuel supply manifold 34 by a turbopump or other suitable mechanisms. The fuel flows through an annulus formed between the opening 132 in the faceplate 24 and the oxidizer post 130, which is positioned to extend into the opening 132. It should be recognized that the present invention can be utilized with nearly any type of injection assembly for providing coaxial delivery of a non-hypergolic propellants, and the particular embodiment shown in FIG. 3 is provided merely as an example.

The oxidizer post 130 is a composite tube having a first end 138 and an opposite second end 140. The first end 138 of the oxidizer post 130 is positioned in the opening 132 through the injector faceplate 24. In the embodiment illustrated in FIG. 3, the first end 138 of the tube 130 is aligned with a plane defined by the exterior face 136 of the faceplate 24. The post 130 has an interior cavity 142 that defines an oxidizer delivery path to the combustion chamber 22. One or more side openings 144 are defined in the post 130 to permit fluid communication between the interior cavity 142 and an oxidizer supply manifold 38, which defines an oxidizer supply path between the oxidizer dome 40 and the interpropellant plate 36. Oxidizer is provided to the oxidizer supply manifold 38 from storage areas (not shown) in a conventional manner, and can be pumped through the oxidizer supply manifold by an oxidizer turbopump or other suitable mechanisms.

The oxidizer post 130 includes a generally inner conductive portion 146 and an outer nonconductive portion 148. The two portions 146 and 148 can be brazed together to form the composite oxidizer post 130. The conductive portion 146 can be made of a metallic material, for example, copper alloys, stainless steels, and high-strength nickel alloys. The nonconductive portion 148 can be made of a ceramic material, for example, Maycor™ ceramic material (available from Ceramic Products, Inc., Palisades Park, N.J.), silicon carbide, or other insulating materials (e.g., a nonconductive polymer material). The conductive portion 146 extends between the first end 138 and the second end 140 of the post 130. The nonconductive portion 148 is positioned in between the first and second ends 138, 140 of the post 130, and leaves regions of the conductive portion 146 exposed at each of the ends 138, 140. The nonconductive portion 148 of the oxidizer post 130 permits the conductive portion 146 of the oxidizer post 130 to be electrically isolated from other components such as the interpropellant plate 36, the oxidizer dome 40, etc. An attachment structure 150, which can be a threaded region, is formed at the second end 140 of the post 130 in order to facilitate an electrical connection between a spark exciter 152 and the conductive portion 146 of the post 130.

The spark exciter 152 is shown schematically in FIG. 3. The exciter 152 is electrically connected to the conductive portion 146 of the post 130, can be a conventional electronic spark supply assembly that generates suitable voltage and current to provide a spark across an air gap between the oxidizer post 130 and the injector faceplate 24.

The interpropellant plate 36 is positioned between the oxidizer dome 40 and the injector faceplate 24, and separates the fuel delivery path and the oxidizer supply path. The oxidizer post 130 passes through the interpropellant plate 36, and the interpropellant plate 36 is brazed to the nonconductive portion 148 of the post in order to form a seal 154 therebetween. The braze material of the seal 154 can be an alloy containing, for example, combinations of gold, silver, nickel and copper.

The oxidizer dome 40 is of a conventional type used with rocket engine injectors. The oxidizer post 130 passes through the oxidizer dome 40, and the nonconductive portion 148 of the oxidizer post 130 is brazed to the oxidizer dome in order to form a seal 156 therebetween. The braze material of the seal 156 can be similar to that of the seal 154.

In an alternative embodiment, such as were the nonconductive portion is made of a nonconductive polymer material, the seals 154 and 156 can be formed by compressively loading, rather than using brazing. The seal 154 can be formed by compressively loading the nonconductive portion 148 between the conductive portion 146 and interpropellant plate 36, and the seal 156 can likewise be formed by compressively loading the nonconductive portion 148 between the conductive portion 146 and the oxidizer dome 40.

In operation, a spark is created between the conductive portion 146 of the oxidizer post 130 (at its first end 138) and the injector faceplate 24 by generating a voltage potential therebetween with the exciter 152. In FIG. 3, an exemplary spark 158 is represented as an electrical arc extending between the oxidizer post 130 and the faceplate 24. Once an ignition spark has been created, delivery of the oxidizer and fuel is then initiated along the oxidizer and fuel delivery paths, respectively, to create a coaxial propellant flow to the combustion chamber 22. The coaxial propellant flow produces a bi-propellant mixture that is ignited by the spark 158. Combustion can then propagate in the combustion chamber 22 to ignite propellants delivered from other injector elements (see FIG. 1).

Figure 4A:
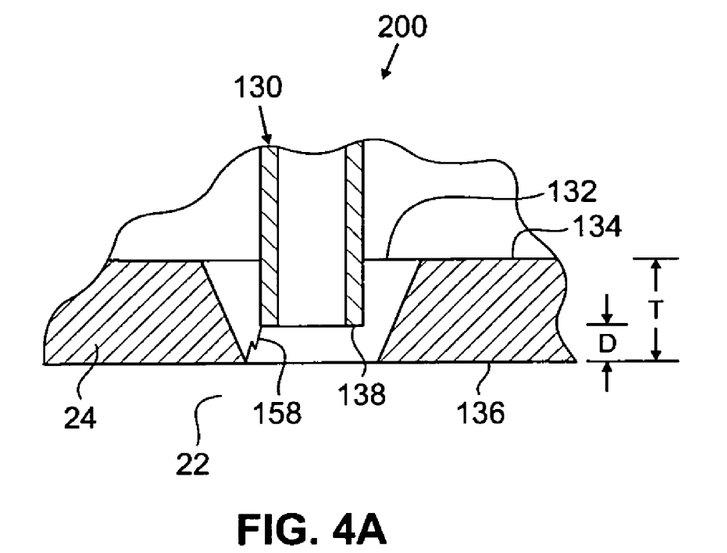
FIG. 4A is a cross-sectional view of a portion of a first alternative embodiment of the ignition element assembly.

The ignition element assembly 100 shown in FIG. 3 is merely one example of possible embodiments of ignition element assemblies according to the present invention. The following are examples of alternative embodiments. FIG. 4A is a cross-sectional view of a portion of a first alternative ignition element assembly 200. The ignition element assembly 200 is generally similar to the ignition element assembly 100 shown and described with respect to FIG. 3. However, with the ignition element assembly 200, the first end of the oxidizer post 130 is recessed from the exterior face 136 of the injector faceplate 24 by a distance D. The distance D is generally less than a thickness T of the faceplate 24. The recessed position of the first end 138 of the oxidizer post 130 helps to control the location for the spark 158, and can help improve performance relative to the coaxial injection of the propellants into the combustion chamber 22.

Figure 4B:
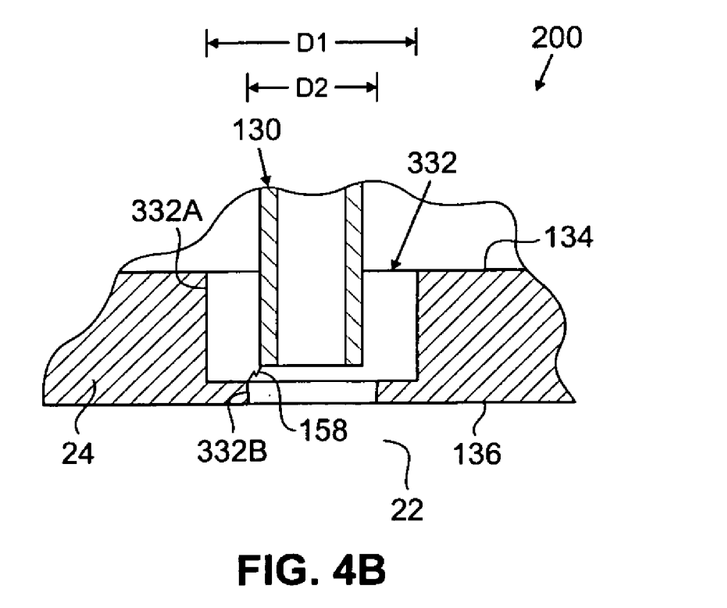
FIG. 4B is a cross-sectional view of a portion of a second alternative embodiment of the ignition element assembly.

FIG. 4B is a cross-sectional view of a portion of a second alternative embodiment of an ignition element assembly 300. The ignition element assembly 300 is generally similar to the ignition element assembly 100 shown and described with respect to FIG. 3. However, with the ignition element assembly 300, the opening 332 in the injector faceplate 24 has a multiple diameters to create a stepped shape. The opening 332 has a first portion 332A, with a first diameter D1, adjacent to the interior face 134 of the faceplate 24, and a second portion 332B, with a smaller second diameter D2, adjacent to the exterior face 136 of the faceplate 24. The stepped shape of opening 332 facilitates a desired shear flow of fuel into the combustion chamber 22.

Figure 4C:
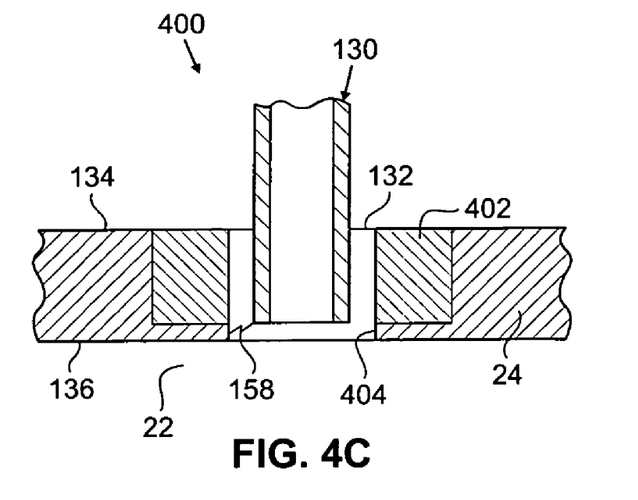
FIG. 4C is a cross-sectional view of a portion of a third alternative embodiment of the ignition element assembly.

FIG. 4C is a cross-sectional view of a portion of a third alternative embodiment of an ignition element assembly 400. The ignition element assembly 400 is generally similar to the ignition element assembly 100 shown and described with respect to FIG. 3. However, with the ignition element assembly 400, a nonconductive insert 402 is disposed along a perimeter portion of the opening 132 in the injector faceplate 24. The nonconductive insert 402 can be a ceramic material brazed to the faceplate, and the ceramic and braze materials can be similar to those described above. The nonconductive insert 402 is positioned adjacent to the interior face 134 of the faceplate, in order to provide a conductive portion 404 at the perimeter of the opening 132 in the faceplate 24 adjacent to the exterior face 136 of the faceplate 24. The nonconductive insert 402 helps to control the location of the spark 158 and to focus the energy of the spark 158.

Figure 4D:
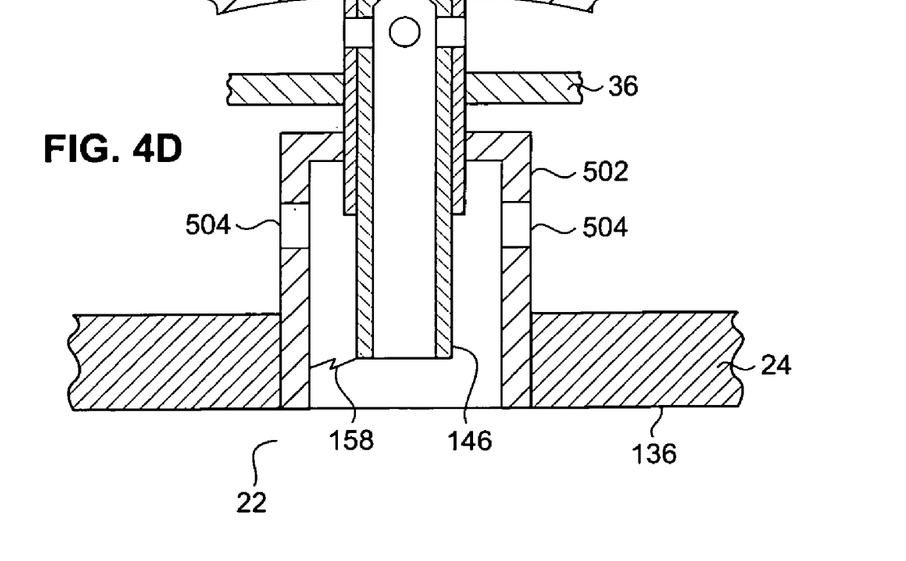
FIG. 4D. Is a cross-sectional view of a portion of a fourth alternative embodiment of an ignition element assembly.

FIG. 4D is a cross-sectional view of a portion of a fourth alternative embodiment of an ignition element assembly 500. The ignition element assembly 500 is generally similar to the ignition element assembly 100 shown and described with respect to FIG. 3. The ignition assembly 500 further includes a fuel sleeve 502 that is secured between the injector faceplate 24 and the nonconductive portion 148 of the oxidizer post 130. The fuel sleeve can be brazed in place. One or more side openings 504 are formed in the fuel sleeve 502 to permit fluid communication between a fuel supply path and the combustion chamber 22. In the illustrated embodiment, the spark 158 is provided between the conductive portion 146 of the oxidizer post 130 and the fuel sleeve 502. An advantage of designs with a fuel sleeve 502 is the additional structural support it provides to the injector faceplate 24.

The present invention provides numerous advantages and benefits. For instance, an ignition element assembly according to the present invention is relatively small and low-mass as compared to large ignition element assemblies that utilize dedicated propellant supplies to maintain a standing torch or "pilot light". Those size and mass benefits facilitate use of the present ignition element assembly with small rocket engines. Moreover, a rocket engine having an array of injection elements need only incorporate an ignition element assembly at one of the injection elements in the array in order to initiate combustion within the combustion chamber.

Because an ignition element assembly according to the present invention can operate like a typical injector element after ignition, high combustion performance can be maintained. This provides performance benefits over past systems utilizing dedicated ignition propellants at off-peak conditions that can reduce overall engine thrust performance.

Furthermore, the ignition element assembly of the present invention is relatively easy and simple to fabricate. Because an exciter of the assembly can be located away from the combustion process and away from the propellant paths, it is relatively easy to route wires or other electrical connection structures to the exciter. Construction of ignition assemblies according to the current invention is further simplified because the ignition assembly does not require special ignition propellant manifolding or ignition flow orifices.

In addition, generating an ignition spark between electrically isolated components of an injector element assembly largely avoids other potential problems. For example, spark ignition assemblies positioned to extend from a combustion chamber wall present difficulties in providing an opening though the combustion chamber wall, which typically includes cooling channels. Re-routing cooling channels undesirably complicates engine design. Moreover, it is difficult to provide and maintain a suitable high pressure hot gas seal around a spark ignition assembly extending through a combustion chamber wall. As another example, ignition systems that must be positioned within a propellant combustion zone also present significant problems with component degradation and breakdown, such as melting or erosion of the spark electrode, due to the extreme conditions present in such locations. The use of off-optimum mixture ratios to avoid such damage will lead to decreased performance.

Although the present invention has been described with reference to preferred embodiments, workers skilled in the art will recognize that changes may be made in form and detail without departing from the spirit and scope of the invention. For instance, the particular sizes and shapes of components of the ignition element assembly of the present invention can vary according to the particular application. Moreover, a variety of non-hypergolic propellants can be utilized.

What is claimed is:

1. An injector assembly comprising:
    an injector faceplate having one or more openings defined therethrough;
    one or more propellant injector tubes, wherein each propellant injector tube is located at a corresponding opening in the injector faceplate; and
    a spark exciter electrically connected to plurality of one or more propellant injector tubes configured to create an ignition spark across a gap between the one of the one or more propellant injector tubes and the injector faceplate to ignite propellants delivered to the combustion chamber.

2. The assembly of claim 1, wherein the one of the one or more propellant injector tubes has a cylindrical shape.

3. The assembly of claim 1, wherein the one of the one or more propellant injector tubes comprises:
    a conductive layer; and
    a nonconductive layer disposed on the conductive layer.

4. The assembly of claim 3, wherein the nonconductive layer comprises a ceramic material.

5. The assembly of claim 1, wherein the one or more openings in the injector faceplace and the corresponding one or more injector tubes define one or more annularly shaped fuel propellant openings.

6. The assembly of claim 1, wherein the one or more openings in the injector faceplace are frusto-conical in shape.

7. An injector assembly comprising:
    a faceplate located adjacent to a combustion chamber, the faceplate having an opening therethrough for injecting propellants into the combustion chamber;
    an injector tube defining a first end and a second end, the injector tube having at least one propellant inlet opening and having a propellant outlet located at its first end, wherein the first end of the injector tube is positioned at or near the opening in the faceplate, wherein the injector tube comprises a conductive material, and wherein the injector tube has an interior passageway for defining a first propellant delivery path between the at least one propellant inlet opening and the propellant outlet;
    an interpropellant divider defining a first propellant supply path in fluid communication with the at least one propellant inlet opening of the injector tube and a second propellant delivery path defined between the interpropellant divider and the faceplate;
    a nonconductive coating disposed on the injector tube to electrically isolate a portion of the injector tube from the faceplate; and
    an exciter electrically connected to the injector tube configured to generate electrical sparks between the injector tube and the faceplate.

8. The assembly of claim 7, wherein the opening defined between the faceplate and the injector tube is annular in shape.

9. The assembly of claim 7, wherein the opening defined in the faceplate is frusto-conical in shape.

* * * * *